United States Patent [19]

Wilson

[11] Patent Number: 5,089,283
[45] Date of Patent: Feb. 18, 1992

[54] CONTINUOUS DOUGH DEVELOPING PROCESS AND APPARATUS

[75] Inventor: Arran Wilson, Christchurch, New Zealand

[73] Assignee: Her Majesty the Queen in right of New Zealand of Dsir Christchurch Wheat Research Institute, Christchurch, New Zealand

[21] Appl. No.: 629,034

[22] Filed: Dec. 19, 1990

Related U.S. Application Data

[63] Continuation of Ser. No. 427,949, Oct. 25, 1989, abandoned, which is a continuation of Ser. No. 228,272, Aug. 4, 1988, abandoned.

[30] Foreign Application Priority Data

Aug. 4, 1987 [NZ] New Zealand .............. 221326

[51] Int. Cl.⁵ .................... A21D 8/02; A21D 10/00
[52] U.S. Cl. .................... 426/498; 426/312; 426/549; 426/504
[58] Field of Search ........... 426/496, 498, 504, 312, 426/549, 531; 366/102

[56] References Cited

U.S. PATENT DOCUMENTS

| | | | |
|---|---|---|---|
| 33,432 | 8/1861 | Fitzgerald | 426/498 |
| 208,783 | 8/1878 | Baird | 366/102 |
| 259,452 | 6/1882 | Ager | 426/482 |
| 622,429 | 4/1899 | Hazzard | 366/102 |
| 1,017,361 | 2/1912 | Adam | 426/498 |
| 2,547,566 | 4/1951 | Cohoe | 426/506 |
| 3,041,176 | 6/1962 | Baker | 426/498 |
| 3,503,343 | 3/1970 | Jackel | 426/498 |
| 3,888,996 | 6/1975 | Turro et al. | 426/62 |
| 4,218,480 | 8/1980 | Dyson et al. | 426/549 |
| 4,364,961 | 12/1982 | Davley et al. | 426/549 |
| 4,568,550 | 2/1986 | Fulger et al. | 426/498 |

*Primary Examiner*—George Yeung
*Attorney, Agent, or Firm*—Fleit, Jacobson, Cohn, Price, Holman & Stern

[57] ABSTRACT

A continuous dough developing process including the steps of:
feeding combined and undeveloped dough to a continuous developing apparatus;
feeding oxygen gas to the combined and undeveloped dough as it is fed to the developing apparatus; and
mixing within the developing apparatus the oxygen and the dough with a rotor which imparts a shearing action between mixing means and the dough, thereby distributing the oxygen evenly throughout the dough.

11 Claims, 4 Drawing Sheets

CONTINUOUS DOUGH DEVELOPING PROCESS AND APPARATUS

This is a continuation of application Ser. No. 07/427,949, filed Oct. 25, 1989, now abandoned, which in turn is a continuation of application Ser. No. 07/228,272 filed Aug. 4, 1988, now abandoned.

FIELD OF THE INVENTION

This invention relates to dough developing, and more particularly to a continuous dough developing process.

BACKGROUND OF THE INVENTION

Bread has traditionally been made in batch processes. The major processes used in New Zealand are the Bulk Fermentation Process and the Mechanical Dough Development Process. In the bulk fermentation process all the dough ingredients are mixed into a homogeneous mass, without doing an unnecessary amount of work. The dough is set aside for a set period of bulk fermentation. The fermentation time can vary widely but is now commonly two hours. A typical formula is as follows:

| Flour | 100 Kg |
|---|---|
| Water | 59-63 kg |
| Yeast | 3 kg |
| Salt | 2 kg |
| Sugar | 2 kg |
| Fat | 2 kg |
| Potassium bromate | 30 ppm. |

As fermentation takes place the dough changes slowly from a dense mass lacking extensibility and with poor gas retention properties, into a smooth extensible dough with good gas retention properties. After fermentation the dough is divided into loaf-sized pieces, given an intermediate "proof" of about ten minutes, and then shaped (moulded).

The moulding process is vital in producing the correct bubble structure in the dough. If a fine uniform cell structure is desired in the bread, final moulding will be required to expel gas and cause large bubbles to collapse to create many smaller bubbles. The dough is then given a final proof of fifty minutes to expand almost to its full size then baked.

During the long fermentation of the fermentation group of processes there is an appreciable loss of flour solids due to their conversion to volatile substances. This loss is economically disadvantageous. In the search for ways of eliminating the need for long periods of fermentation, and also of reducing the loss of flour solids, mechanical dough development was discovered. By this technique, desirable changes in the physical properites of the dough, normally brought about by fermentation, are achieved by a short period of intense mechanical development in the presence of added fat and a moderately high level of a synthetic oxidising agent.

In mechnical dough development the initial fermentation step is replaced by a short period of intense mixing in a special high powered batch mixer that imparts between 5 and 12 Wh/kg (Watt-hours per kilogram) of work to all the dough ingredients in two to four minutes. Such mixers are usually operated under a partial vacuum to improve the crumb texture. The dough is then treated as for a bulk fermentation dough, that is, it is divided, given 10 minutes intermediate proof, moulded, given 50 minutes final proof and baked.

While this mechanical dough development process succeeds in reducing fermentation time and loss of flour solids, there are still inherent difficulties. The addition of a synthetic oxidising agent (potassium bromate) is undesirable for some markers.

The dough from the end of a batch waits longer to be processed than the dough from the start of a batch, leading to changes in dough consistency within batches. The intermediate proof step is still needed. A high-powered motor is required, which is used only intermittently. Further, the process is still a batch process, which is inconvenient for automation.

The object of the present invention is to provide a dough development process and apparatus which will go at least some way towards avoiding the above disadvantages.

SUMMARY OF THE INVENTION

A continuous dough developing process including the steps of:

feeding combined and undeveloped dough to a continuous developing apparatus;

feeding oxygen gas to the combined and undeveloped dough as it is fed to the developing apparatus; and mixing within the developing apparatus the oxygen and the dough with a rotor which imparts a shearing action between mixing means and the dough, thereby distributing the oxygen evenly throughout the dough.

A continuous dough developing apparatus, the apparatus including a generally cylindrical mixer, the inner surface of which has a plurality of inwardly directed pins and an internal rotor positioned within the cylindrical mixer, the rotor having on its periphery a plurality of outwardly extending pins, the internal pins of the mixer and the external pins of the rotor being positioned relative to each other so as to produce in a combined and undeveloped dough to which oxygen gas is fed as it passes through the apparatus a shearing action which thereby mixes the oxygen evenly throughout the dough.

With a continuous dough development process, a smaller motor is required to develop the dough compared with that used in a batch mixer and it is not subjected to the strain of frequent stopping and starting. Also, a continuous process ensures that all dough has the same processing time and is therefore of the same consistency. Potassium bromate is not used in the formula but instead oxygen gas is fed into the developing dough to aid oxidation, and is distributed evenly and finely throughout the dough. This allows the dough to be extruded directly into bread tins, without the need for intermediate proof or moulding, and still produces bread similar in character to that produced from the standard mechanical dough development process. The amount of work imparted to the dough can be varied by adding or removing pins from the internal rotor as well as by varying the developer's speed. The internal rotor is hollow, and open at one end to facilitate the removal or addition of rotor pins without needing to dismantle the developer. With the use of continuous ingredient feeders the process can readily be fully automated.

The apparatus consists of a generally cylindrical mixer, the inner surface of which has a plurality of inwardly directed pins and a hollow inner rotor positioned within the cylindrical mixer. The rotor has a plurality of outwardly directed pins. The internal pins of the mixer and the pins of the rotor are positioned relative to each other to produce a strong shearing action on a combined but undeveloped dough. Means are provided for feeding oxygen gas to the dough as it passes through the mixer, and the shearing action mixes the oxygen gas throughout the dough.

Further aspects of the invention will become apparant from the following description which is given by way of example only.

DESCRIPTION OF THE PREFERRED EMBODIMENT

Figure 1:
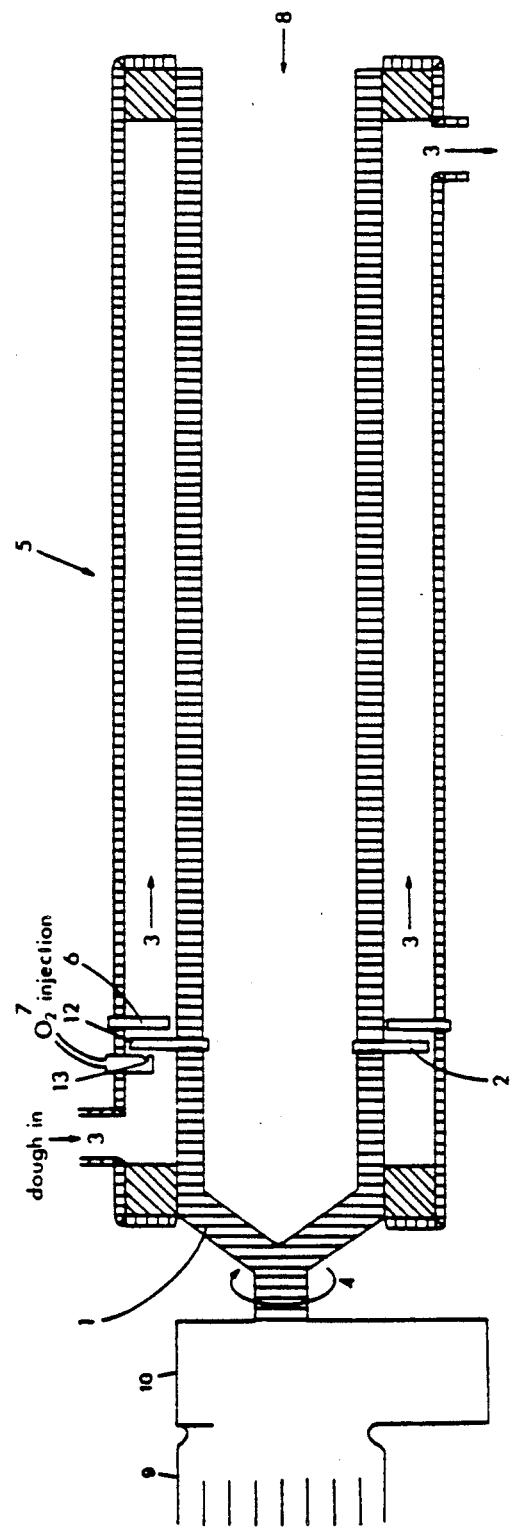
FIG. 1 shows a longitudinal section through a developer.

In developing the present invention the applicants realised that an intermediate proof step was usually required to allow the oxidising agents added to bread to act and change the dough structure. This ensured that when moulded the texture in the resulting bread would be fine and uniform. By the use of oxygen gas and ascorbic acid as oxidising agents this oxidation step can be shortened. Oxidation can take place essentially within the developer, so eliminating the need for intermediate proof and moulding.

For the oxygen to be effective it must be distributed throughout the dough, and the oxygen bubbles must be finely divided to avoid large holes in the bread. For mechanical dough development to take place the dough should have between 5 and 12 Wh/kg of work imparted to it (the actual amount depending for instance, on the flour used). The mixing action, therefore, must be such as to impart a large amount of work to the dough and at the same time to distribute the oxygen evenly and finely throughout the dough mass.

In order to achieve this aim the applicants carried out many trials and have discovered that the use of the apparatus as shown in the drawings achieves this end.

The rotor 1 has a plurality of radially extending pins 2. In the example the pins 2 are arranged in four spirals which have the effect of improving dough flow in the direction of arrow 3 for rotation of rotor 1 in the direction of arrow 4.

The rotor 1 is mounted within an outer mixer casing 5 which has a plurality of inwardly directed pins 6. The pins 6 of casing 5 may also be in four spiral rows and the spacings between pins 6 and 2 when the rotor 1 is in place is such that a shearing action is created in the dough mixing region between the pins 6 and pins 2.

Combined but not developed dough is forced through the mixing space by means of a pump or other suitable apparatus. Oxygen gas is injected into the dough immediately before the first pins at end 7. With the rotor turning at between 100 and 300 rpm a strong shearing action is created between the pins producing intense mixing and at the same time distributing the oxygen throughout the dough.

A dough is mixed in order to combine all the ingredients, except oxygen, but not develop them. This mixing can take place in a batch mixer or a continuous mixer. A typical dough formula is as follows:

| | |
|---|---|
| Flour | 100% |
| Water | 60% |
| Yeast | 3.5% |
| Gluten | 2% |
| Salt | 2% |
| Sugar | 2% |
| Compound improver | 1.25% |
| Ascorbic acid | 100 ppm. |

For optimum bread quality the dough temperature as it leaves the developer should be 32° C. To achieve this the dough water temperature is adjusted so that the amount of work given will raise the dough temperature to 32° C. Formulae for carrying out such calculations are readily available. A standard form of the calculation is as follows:

$$[2 \times 32 - (WI \times 1.33)] - FT = \text{Required water temperature}$$

Where
WI = work input in Wh/Kg
FT = flour temperature in degrees celsius.

The combined ingredients are placed in the hopper of a pump which then forces the dough, at a constant rate, through the continuous developer. The production rate is determined by the pumping rate.

Figure 2:
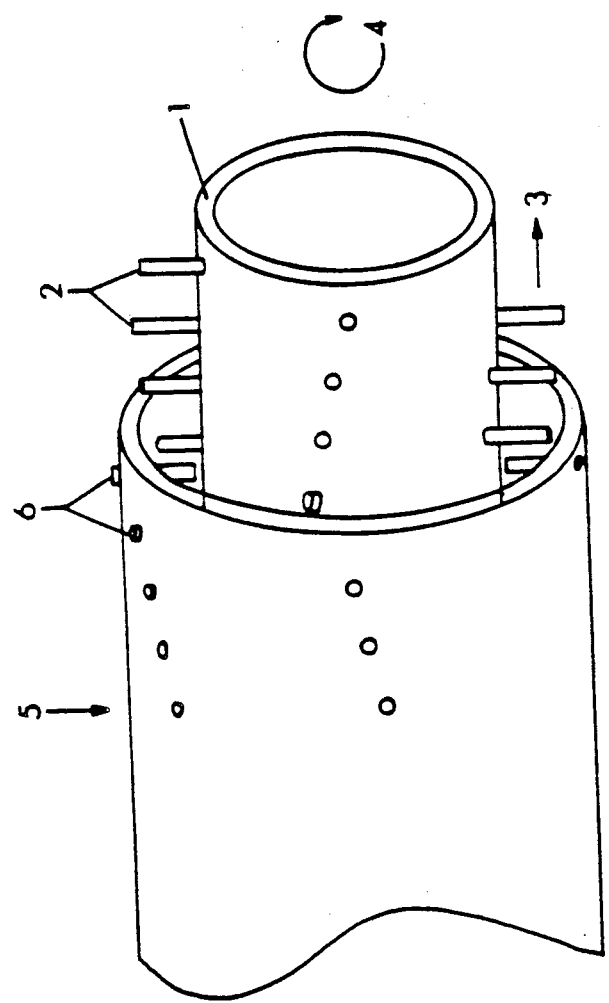
FIG. 2 shows a perspective view of the rotor and housing.
Figure 3:
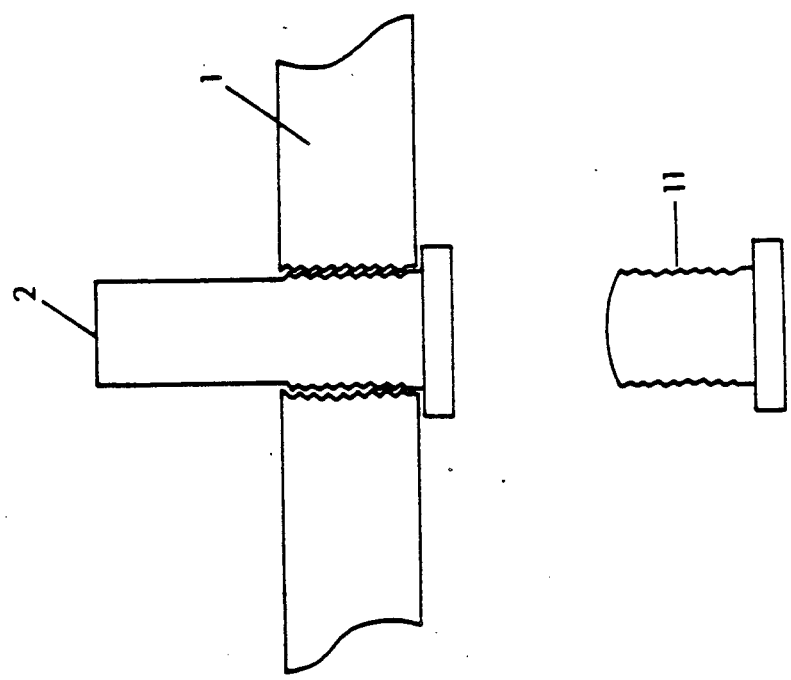
FIG. 3 shows a detail of a rotor pin.

The operation of the developer can best be described by referring to FIGS. 1, 2 and 3. The present developer consists of a hollow inner rotor 1 of 135 mm external diameter and 500 mm length. Four spirals of 10 mm diameter pins 2 protrude 30 mm with approximately 20 mm between each pin. FIG. 3 shows details of a rotor pin and its screw mounting.

To decrease the amount of work given to the dough the pin can be unscrewed and a blank pin 11 screwed in to fill the hole. The spirals of pins turn one quarter turn along the length of the rotor. The rotor is contained in an external housing tube 5 of 160 mm internal diameter of the same length. Four spirals of identical pins 6 protrude into the space between the rotor and the housing. The outer spirals are of opposite pitch to the rotor spirals. The rotor is turned in the direction of arrow 4 at a rate of 150 rpm by a 3-phase motor 9 through a gearbox 10. The rotor speed can be varied but below 100 rpm the oxygen is not well incorporated and above 200 rpm the resulting bread is of inferior texture and volume. Oxygen is injected into the developer directly adjacent to the first row of pins 12, through a 0.5 mm diameter nozzle 13. When the dough was pumped through the developer in the direction of arrow 3 at a rate of 400 kg/hour an oxygen flow rate of 6 L/minute (at standard pressure) was used. This gave an oxygen proportion of 0.9 liters per kg of dough which was approximately 1.4 liters per kg of flour.

As has been noted for optimum development a mechanically developed dough should receive a work input of between 5 and 12 Wh/kg, the optimum value varying for individual flours. To achieve variable amounts of work input, the number of pins on the rotor and the rotor speed can be varied. It is intended the main adjustment shall be made by varying the number of pins protruding from the inner rotor, which can be done while the rotor is stationary. Fine adjustment of work input while the mixer is working can then be achieved by adjusting the rotor speed. This can most readily be achieved by use of a speed controller attached to the motor. To facilitate the removal of rotor pins the inner rotor is hollow and open at end 8 so that the pins can be removed without dismantling the mixer.

This has the added advantage of allowing easy replacement of pins as they become worn.

Figure 4:
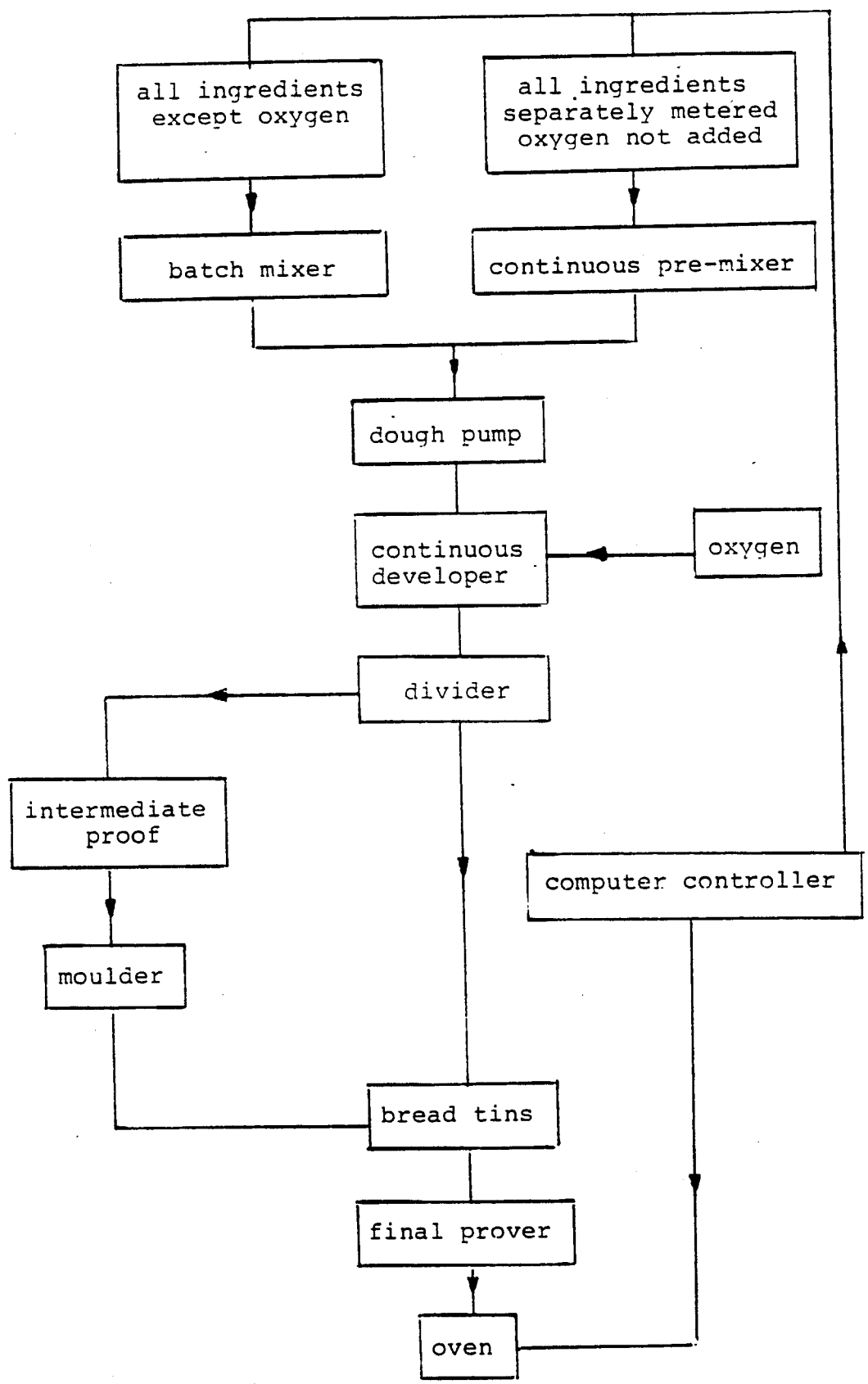
FIG. 4 shows a flow diagram which illustrates a baking process incorporating the invention.

The developed dough is extruded out of the end of the developer. From here as shown in FIG. 4 the dough can be divided and directly placed into bread tins or can be passed on to the traditional make up plant of divider, intermediate prover and moulder. The process can be automated by incorporating a computer controller adapted to control and monitor the input of ingredients, operation of the process and quality of the resultant output. This includes control of the operation of the mechanisms incorporated—in the baking process shown in FIG. 4.

For full scale commercial production the developer would need to be able to produce up to 6000 kg of developed dough an hour. To scale up the present design to produce this amount of dough it is envisaged the mixer would have the following dimensions. The internal rotor will have a diameter of 200 mm and a length of 1000 mm. The four spirals of 10 mm diameter pins will protrude 99 mm with approximately 30 mm clearance between each pin. The spirals are to be of the same pitch to give one half turn along the length of the rotor. The rotor will be contained in an external housing of 300 mm internal diameter. Four identical spirals of pins will protrude from the housing into the space between the rotor and housing. The housing spirals will be of opposite pitch to those of the rotor and the rotor will be turned at between 100 and 200 rpm.

Due to possible differences in mixing efficiencies the optimum rotor speed may be different and the amount of oxygen injected may need to be varied from the present rate of 0.9 L/kg of dough. Possibly more than one injection point may also need to be used.

A particular embodiment of the invention has been described herein by way of example and it is envisaged that improvements can take place without departing from the scope and spirit of the appended claims.

What we do claim and desire to obtain by Letters Patent of the United States is:

1. A continuous process for the production of bread dough comprising the steps of:
   feeding to a continuous developing apparatus dough including ingredients of flour, water, yeast, a reduction/oxidation reagent selected from a group including ascorbic acid, and other substances which have been mixed sufficiently prior to said feeding to combine the ingredients;
   feeding oxygen gas at a rate on the order of about 0.9 liters per kilogram of dough to the dough as the dough is fed to the developing apparatus;
   mixing within the developing apparatus the oxygen and the dough with a mixing rotor which imparts a high shearing action between mixing means and the dough to thereby develop the dough and distribute the oxygen evenly throughout the dough to enable the oxygen to react with the reduction/oxidation reagent, flour and other substances;
   extruding the dough without gelatinization of the dough from the developing apparatus; and
   immediately as the dough leaves the developing apparatus dividing the dough to form individual pieces in preparation for baking.

2. A continuous dough developing process as claimed in claim 1 wherein the dough is extruded directly into baking tins for baking.

3. A continuous dough developing process as claimed in claim 1 wherein the work imparted to the dough during mixing is varied by adding or removing pins from the mixing rotor.

4. A continuous dough developing process as claimed in claim 1, further comprising varying the rotational speed of the rotor.

5. A continuous dough developing process as claimed in claim 1, further comprised of said steps being automated.

6. The continuous dough developing process of claim 1, further comprising mixing said dough and oxygen in a developing apparatus including:
   a generally cylindrical mixer having an inner surface;
   a plurality of inwardly directed pins disposed on said inner surface;
   an internal rotor having a periphery, positioned within said cylindrical mixer; and
   a plurality of outwardly extending pins disposed on the periphery and positioned relative to the inwardly directed pins of said rotor to produce said shearing action in the dough fed thereonto, and thereby mixing the oxygen gas evenly throughout the dough.

7. A continuous dough developing process including the steps of:
   feeding continuously to a continuous developing apparatus mixed dough including ingredients of flour, water, yeast, ascorbic acid and other ingredients which have been mixed sufficiently prior to said feeding to combine the ingredients;
   feeding oxygen gas on the order of about 0.9 liters per kilogram of dough to the mixed dough as the mixed dough is fed through the developing apparatus;
   mixing continuously within the developing apparatus the oxygen and the dough with a mixing rotor to impart a shearing action between mixing means and the dough and thereby distribute the oxygen evenly throughout the dough to enable the dough to react with the ascorbic acid, flour and other ingredients; and
   without gelatinization of the dough extruding the dough continuously directly into individual units for subsequent baking.

8. A continuous dough developing process including the steps of:
   feeding continuously to a continuous developing apparatus mixed dough including ingredients of flour, water, yeast, ascorbic acid and other ingredients which have been mixed sufficiently prior to said feeding to combine the ingredients;
   feeding oxygen gas on the order of about 0.9 liters per kilogram of dough to the mixed dough as the mixed dough is fed through the developing apparatus;
   mixing continuously within the developing apparatus the oxygen and the dough with a mixing rotor to impart a shearing action between mixing means and the dough and thereby distribute the oxygen evenly throughout the dough to enable the dough to react with the ascorbic acid, flour and other ingredients; and
   without gelatinization of the dough extruding the dough continuously directly into individual units for subsequent baking further comprising performing said mixing of said dough and oxygen in a developing apparatus including:

a generally cylindrical mixer having an inner surface;

a plurality of inwardly directed pins disposed on said inner surface;

an internal rotor having a periphery, positioned within said cylindrical mixer; and a plurality of outwardly extending pins disposed on the periphery and positioned relative to the inwardly directed pins of said rotor to produce said shearing action in the dough fed thereinto, and thereby mixing the oxygen gas evenly throughout the dough while imparting between approximately 5 and 12 watt-hours per kilogram of work to the dough.

9. A continuous process for the production of bread dough comprising the steps of:

feeding to a continuous developing apparatus dough including ingredients of flour, water, yeast, a reduction/oxidation reagent selected from a group including ascorbic acid, and other substances which have been mixed sufficiently prior to said feeding to combine the ingredients;

feeding oxygen gas at a rate on the order of about 0.9 liters per kilogram of dough to the dough as the dough is fed to the developing apparatus;

mixing within the developing apparatus the oxygen and the dough with a mixing rotor which imparts a high shearing action between mixing means and the dough to thereby develop the dough and distribute the oxygen evenly throughout the dough to enable the oxygen to react with the reduction/oxidation reagent, flour and other substances;

extruding the dough without gelatinization of the dough from the developing apparatus; and immediately as the dough leaves the developing apparatus dividing the dough to form individual pieces in preparation for baking wherein the amount of work imparted to the dough during said mixing step is between 5 and 12 watt hours per kilogram of dough.

10. The process of claim 9 wherein the extruded dough has an internal temperature less than 54° C. and usually between 30° and 40° C.

11. A continuous process for the production of bread comprising the steps of:

feeding to a continuous developing apparatus dough including ingredients of flour, water, yeast, a reduction/oxidation reagent selected from a group including ascorbic acid, and other substances which have been mixed sufficiently prior to said feeding to combine the ingredients;

feeding oxygen gas at a rate on the order of about 0.9 liters per kilogram of dough to the dough as the dough is fed to the developing apparatus;

mixing within the developing apparatus the oxygen and the dough with a mixing rotor which imparts a high shearing action between mixing means and the dough to thereby develop the dough and distribute the oxygen evenly throughout the dough to enable the oxygen to react with the reduction/oxidation reagent, flour and other substances;

extruding the dough without gelatinization of the dough from the developing apparatus;

immediately the dough leaves the developing apparatus dividing the dough to form individual pieces; and processing the individual pieces in known manner through to baking to form bread.

* * * * *